United States Patent
Shen et al.

(10) Patent No.: US 9,606,295 B1
(45) Date of Patent: Mar. 28, 2017

(54) LENS ASSEMBLY FOR FIBER-OPTIC COMMUNICATION SYSTEM

(71) Applicant: Forward Optics Co., Ltd., Taichung (TW)

(72) Inventors: Wei Shen, Taichung (TW); Chia-Jung Chang, Taichung (TW); Yuan-Lin Lee, Taichung (TW)

(73) Assignee: Forward Optics Co., Ltd., Taichung (TW)

( * ) Notice: Subject to any disclaimer, the term of this patent is extended or adjusted under 35 U.S.C. 154(b) by 0 days.

(21) Appl. No.: 14/849,977

(22) Filed: Sep. 10, 2015

(51) Int. Cl.
G02B 6/32 (2006.01)
G02B 5/20 (2006.01)
G02B 3/00 (2006.01)

(52) U.S. Cl.
CPC ............. *G02B 6/32* (2013.01); *G02B 3/0006* (2013.01); *G02B 5/205* (2013.01)

(58) Field of Classification Search
CPC ................................. G02B 6/32; G02B 3/0012
USPC ........................................................... 359/738
See application file for complete search history.

(56) References Cited

U.S. PATENT DOCUMENTS

2007/0273977 A1* 11/2007 Nemoto .................... C08J 7/18
359/664
2015/0276994 A1* 10/2015 Shen ..................... G02B 3/0012
204/157.41

* cited by examiner

Primary Examiner — James Jones
(74) Attorney, Agent, or Firm — Trop Pruner & Hu, P.C.

(57) ABSTRACT

A lens assembly is used in a fiber-optic communication system, and includes a substrate and at least one lens unit formed on the substrate. The lens unit has first and second surfaces, a first light-transmissive region proximate to the first surface, a second light-transmissive region proximate to the second surface, a light attenuation region located between the first and second light-transmissive regions, and an optical axis passing through the first and second light-transmissive regions and the light attenuation region. The light attenuation region has at least one attenuation layer formed with multiple carbonized spots using a high-energy beam such that the light transmittance of the lens unit is not greater than 70%.

8 Claims, 5 Drawing Sheets

LENS ASSEMBLY FOR FIBER-OPTIC COMMUNICATION SYSTEM

FIELD

The disclosure relates to a lens assembly, more particularly to a lens assembly for a fiber-optic communication system.

BACKGROUND

Referring to FIG. 1, a conventional lens assembly 1 includes a plurality of lens units 11. At least one optical coating is formed on selected ones of the lens units 11 by a film deposition technique so as to control the light transmittance of the lens units 11 at a desired value. However, quality of the optical coating may be adversely affected by unfavorable environmental conditions such as high temperature, high humidity or sudden change in temperature. Under such conditions, the optical coating may lose its structural integrity, peel from the lens units 11, experience change in optical properties or even become malfunctioned. Moreover, owing to the small size of the lens units 11, it is difficult to form the optical coating only on the lens units 11. Portions of the conventional lens assembly 1 other than the lens units 11 may be undesirably coated with the optical coating, thereby resulting in a waste of coating materials.

Referring to FIG. 2, US Patent Application Publication No. 2007/273977 A1 discloses a resin lens unit 2 having a plurality of light-transmissive regions 21 and a plurality of light-shielding regions 22 disposed outside of the light-transmissive regions 21 for removing stray light coming from adjacent light-transmissive regions 21. Since the resin lens unit 2 is used in imaging or illumination applications, the light-shielding regions 22 are not designed to be disposed in the light-transmissive regions 21 so that imaging or illumination qualities are not adversely affected. As such, an optical coating is still required in order to change the light transmittance of the resin lens unit 2 to a desirable value.

SUMMARY

Therefore, an object of the present disclosure is to provide a lens assembly for a fiber-optic communication system, which has a desirable light transmittance and which is durable under unfavorable environmental conditions.

According to an aspect of this disclosure, a lens assembly for a fiber-optic communication system includes a substrate and at least one lens unit that is formed on the substrate. The at least one lens unit has a first surface, a second surface, a first light-transmissive region proximate to the first surface, a second light-transmissive region proximate to the second surface, a light attenuation region located between the first and second light-transmissive regions, and an optical axis passing through the first and second light-transmissive regions and the light attenuation region. The light attenuation region has at least one attenuation layer that is formed with a plurality of carbonized spots using a high-energy beam such that the light transmittance of the lens unit is not greater than 70%.

BRIEF DESCRIPTION OF THE DRAWINGS

Other features and advantages of the present disclosure will become apparent in the following detailed description of the exemplary embodiment and variation with reference to the accompanying drawings, of which.

DETAILED DESCRIPTION

Figure 1:
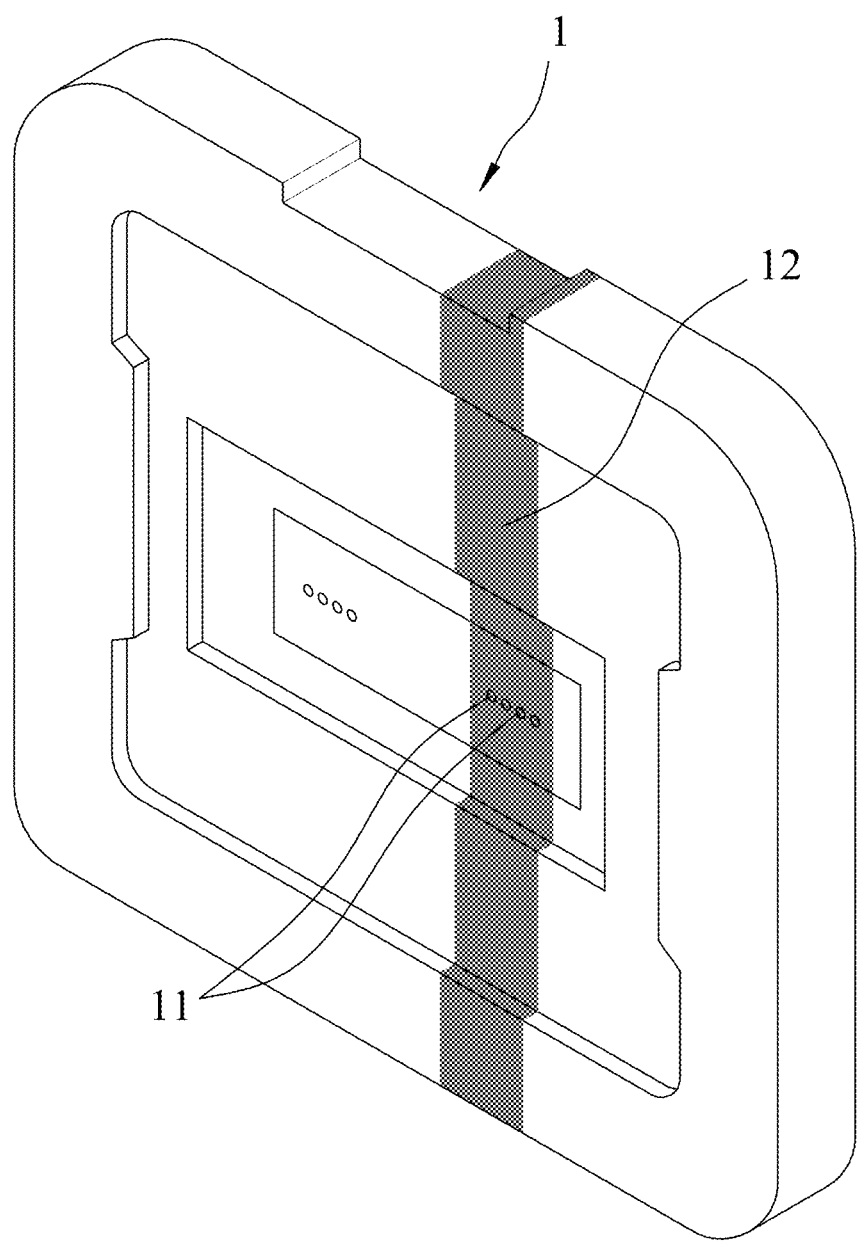
FIG. 1 is a perspective view of a conventional lens assembly formed with an optical coating.
Figure 2:
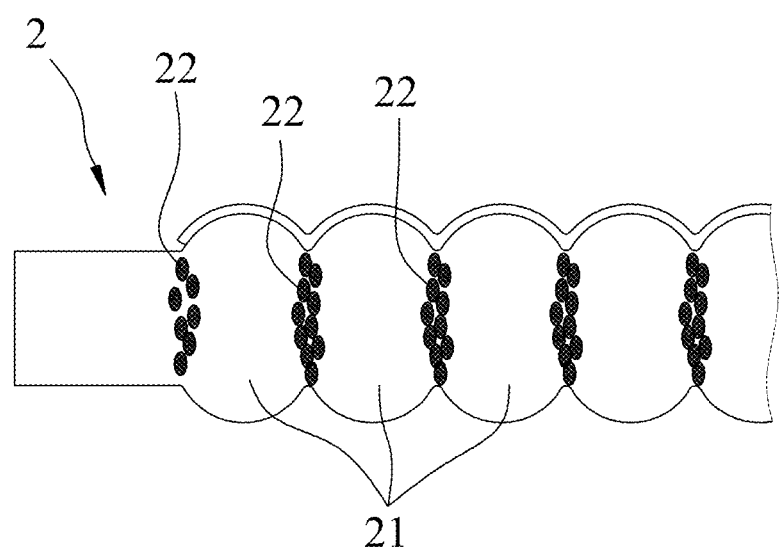
FIG. 2 is a fragmentary schematic view of a resin lens unit disclosed in US Patent Application Publication No. 2007/273977 A1.
Figure 3:
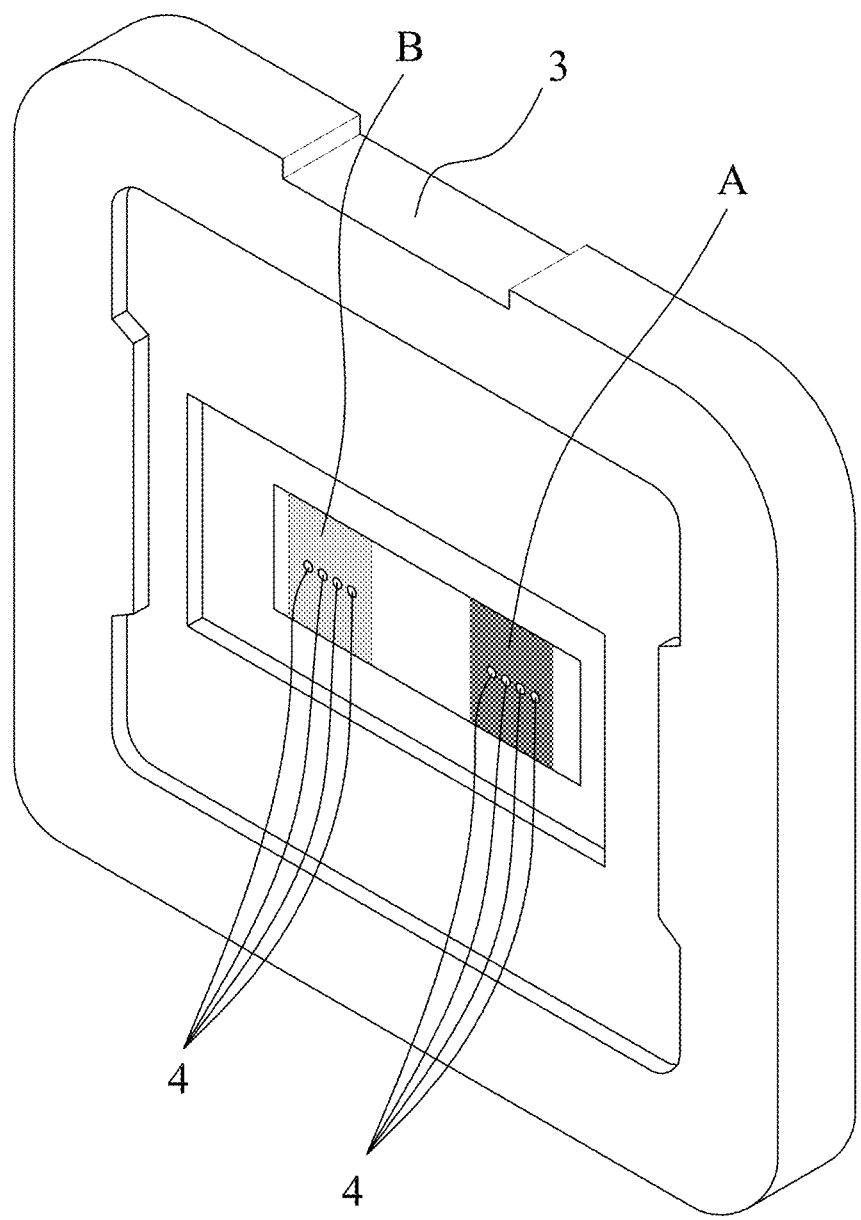
FIG. 3 is a perspective view of an exemplary embodiment of a lens assembly according to the present disclosure.
Figure 4:
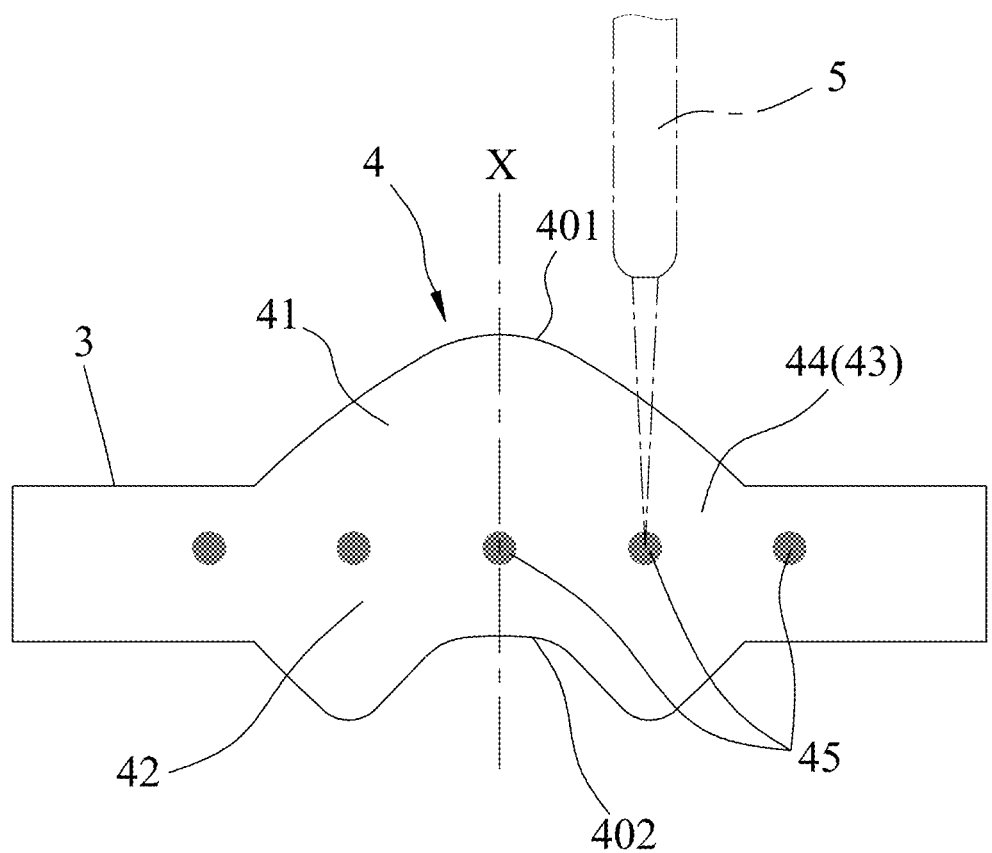
FIG. 4 is a schematic view of the exemplary embodiment, showing formation of a plurality of carbonized spots in a lens unit of the lens assembly using a high-energy beam.
Figure 5:
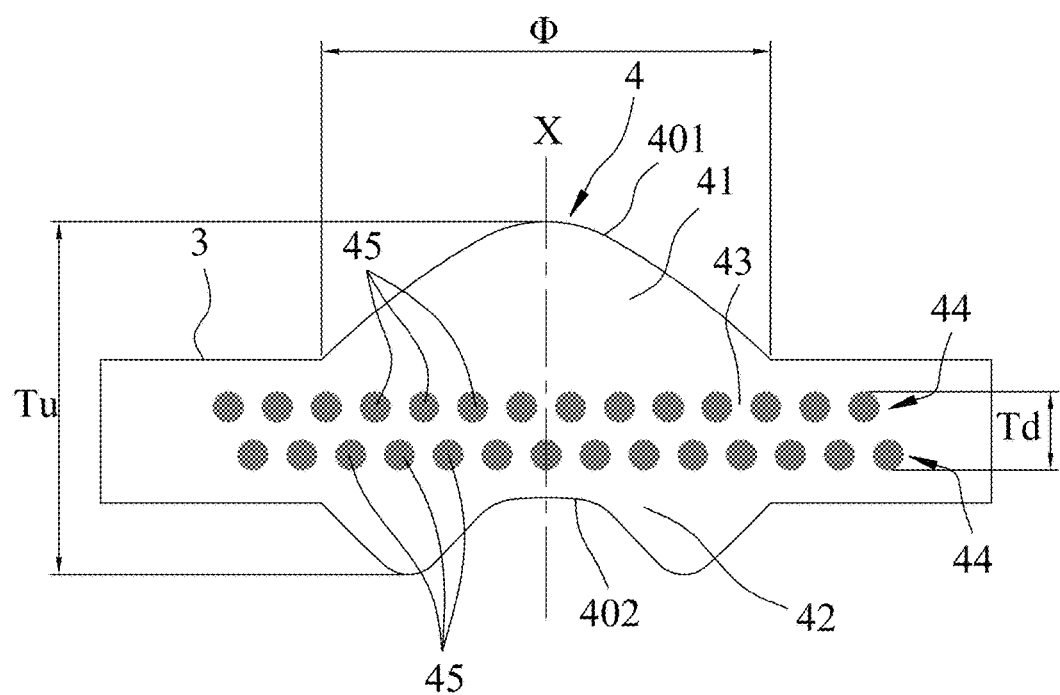
FIG. 5 is a schematic view of the exemplary embodiment, showing the lens unit formed with a plurality of the carbonized spots.

Referring to FIGS. 3 to 5, an exemplary embodiment of a lens assembly of the present disclosure is used in a fiber-optic communication system.

The lens assembly includes a substrate 3 and at least one lens unit 4 formed on the substrate 3. In this embodiment, the lens assembly includes a plurality of the lens units 4 that are arranged in an array. The number of the lens units 4 may be altered according to practical requirements.

Each of the lens units 4 of the lens assembly has a first surface 401, a second surface 402, a first light-transmissive region 41 proximate to the first surface 401, a second light-transmissive region 42 proximate to the second surface 402, a light attenuation region 43 located between the first and second light-transmissive regions 41, 42, and an optical axis (X) passing through the first and second light-transmissive regions 41, 42 and the light attenuation region 43.

The optical axis (X) of each of the lens units 4 passes through a geometric center of the first light-transmissive region 41, and a geometric center of the second light-transmissive region 42, and is perpendicular to a surface of the substrate 3.

The light attenuation region 43 of each of the lens units 4 has at least one attenuation layer 44 that results in a decrease in light transmittance of the lens unit 4. In this embodiment, the light attenuation region 43 of each of the lens units 4 has two attenuation layers 44. The number of the attenuation layers 44 may be altered according to practical requirements.

Each of the attenuation layers 44 of a corresponding one of the lens units 4 is formed with a plurality of carbonized spots 45 for absorbing incident light so as to change the light transmittance of the corresponding one of the lens units 4. In this embodiment, the carbonized spots 45 in each of the attenuation layers 44 are regularly arranged. The carbonized spots 45 of each of the attenuation layers 44 are staggered relative to the carbonized spots 45 of an adjacent one of the attenuation layers 44. The arrangement of the carbonized spots 45 in each of the lens units 4 would affect the light transmittance of the lens unit 4, and may be altered according to practical requirements.

Referring back to FIG. 4, the carbonized spots 45 of each of the lens units 4 are formed by carbonizing the lens unit 4 using a high-energy beam 5 (e.g., laser beam). The advantages of using the high-energy beam 5 reside in that the high-energy beam 5 can be focused to a small area and can be used with a positioning system, so that the carbonized spots 45 can be formed precisely in desirable arrangements and dimensions.

Each of the lens units 4 is selected from the group consisting of a spherical lens, an aspheric lens, a free form lens, a flat lens, and combinations thereof. Note that the surface structure of the lens units 4 should not be limited by what are disclosed in the present disclosure and may be changed according to practical requirements, as long as an incident light can be guided to pass through a corresponding one of the lens units 4 along the optical axis (X) of the lens unit 4.

Each of the lens units 4 is made of a material selected from the group consisting of a polymer material, a glass material, and a semiconductor material, and has a light transmittance greater than 70%. After formation of the carbonized spots 45, the light transmittance of a respective one of the lens units 4 is not greater than 70%. Note that the material used for the lens units 4 should not be limited by what are disclosed in the present disclosure and may be changed according to practical requirements, as long as the lens units 4 can be carbonized by the high-energy beam 5.

Referring back to FIG. 5, each of the lens units 4 has a diameter ($\Phi$) not greater than 3 mm. In this embodiment, each of the lens units 4 has a diameter ($\Phi$) of 0.5 mm. The light attenuation region 43 of each of the lens units 4 has a thickness (Td) not greater than two thirds of a thickness (Tu, a maximum distance between the first and second surfaces 401, 402) of the lens unit 4.

Referring back to FIGS. 3 and 5, in use, an incident light enters the first light-transmissive region 41, passes through the light attenuation region 43 and the second light-transmissive region 42, and exits the lens unit 4. After passing through the light attenuation region 43, energy of the incident light is decreased. A ratio of energy of exiting light to the energy of the incident light is defined to be the light transmittance of the lens unit 4. Light transmittance of the lens units 4 can be altered by changing the number of the attenuation layers 44, the amount of the carbonized spots 45, or the arrangement of the carbonized spots 45. FIG. 3 shows a region (A) with relatively dark color and a region (B) with relatively light color. The lens units 4 located in the region (A) has more carbonized spots 45 than those located in the region (B). Therefore, the lens units 4 in the region (A) have better light attenuation effect than those in the region (B).

In a variation of this embodiment, each of the lens units 4 may further have a reflecting portion for guiding an incident light entering the first surface 401 to proceed parallel to the optical axis (X) and pass through the light attenuation region 43, thereby achieving light attenuation purpose.

To sum up, with the optical axis (X) passing through the light attenuation region 43 of a corresponding one of the lens units 4, the incident light would pass through the light attenuation region 43, thereby achieving the purpose of light attenuation. It should be particularly pointed out that the purpose of the lens assembly of the present disclosure is to be used in the fiber-optic communication system for transmitting light energy and not for imaging purposes. Therefore, formation of the carbonized spots 45 in the path of the optical axis (X) would not adversely affect functionality of the lens assembly. Furthermore, since the carbonized spots 45 are formed by directly carbonizing the corresponding lens unit 4 using the high-energy beam 5, the manufacturing costs could be reduced and the problems of the optical coating encountered in the conventional lens assembly could be prevented.

While the disclosure has been described in connection with what are considered the exemplary embodiment and variation, it is understood that this disclosure is not limited to the disclosed exemplary embodiment and variation but is intended to cover various arrangements included within the spirit and scope of the broadest interpretation so as to encompass all such modifications and equivalent arrangements.

What is claimed is:

1. A lens assembly for a fiber-optic communication system, said lens assembly comprising:
   a substrate; and
   at least one lens unit that is formed on said substrate, and that has a first surface, a second surface, a first light-transmissive region proximate to said first surface, a second light-transmissive region proximate to said second surface, a light attenuation region located between said first and second light-transmissive regions, and an optical axis passing through said first and second light-transmissive regions and said light attenuation region, said light attenuation region having at least one attenuation layer that is formed with a plurality of carbonized spots using a high-energy beam such that the light transmittance of said lens unit is not greater than 70%,
   wherein said optical axis passes through a geometric center of said first light-transmissive region, and a geometric center of said second light-transmissive region.

2. The lens assembly as claimed in claim 1, wherein said light attenuation region has a plurality of said attenuation layers, each of which is formed with a plurality of said carbonized spots.

3. The lens assembly as claimed in claim 2, wherein said carbonized spots of each of said attenuation layers are regularly arranged, said carbonized spots of each of said attenuation layers being staggered relative to said carbonized spots of an adjacent one of said attenuation layers.

4. The lens assembly as claimed in claim 1, wherein said at least one lens unit has a diameter not greater than 3 mm, said light attenuation region having a thickness not greater than two thirds of a thickness of said at least one lens unit.

5. The lens assembly as claimed in claim 1, wherein said lens assembly comprises a plurality of said lens units that are arranged in an array.

6. The lens assembly as claimed in claim 1, wherein said optical axis is perpendicular to a surface of said substrate.

7. The lens assembly as claimed in claim 1, wherein said at least one lens unit is selected from the group consisting of a spherical lens, an aspheric lens, a free form lens, a flat lens, and combinations thereof.

8. The lens assembly as claimed in claim 1, wherein said at least one lens unit is made of a material selected from the group consisting of a polymer material, a glass material, and a semiconductor material.

* * * * *